(12) United States Patent
Li et al.

(10) Patent No.: US 12,196,542 B2
(45) Date of Patent: Jan. 14, 2025

(54) PHASE SHIFT-BASED THREE-DIMENSIONAL MEASUREMENT SYSTEM WITH MULTIPLE CALIBRATION SURFACES AND CALIBRATION METHOD THEREOF

(71) Applicant: INDUSTRIAL TECHNOLOGY RESEARCH INSTITUTE, Hsinchu (TW)

(72) Inventors: Jhe-Ruei Li, Tainan (TW); Wei-Shiang Huang, Tainan (TW); Tsai-Ling Kao, Tainan (TW); Chun-Yi Lee, Chiayi (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 335 days.

(21) Appl. No.: 17/744,451

(22) Filed: May 13, 2022

(65) Prior Publication Data
US 2023/0184541 A1 Jun. 15, 2023

(30) Foreign Application Priority Data
Dec. 10, 2021 (TW) ................................ 110146320

(51) Int. Cl.
*G01B 11/25* (2006.01)
(52) U.S. Cl.
CPC ...... *G01B 11/2504* (2013.01); *G01B 11/2518* (2013.01); *G01B 11/2527* (2013.01)
(58) Field of Classification Search
CPC ............ G01B 11/0675; G01B 9/02055; G01B 11/2504; G01B 11/2518; G01B 11/2527; G01B 11/25; G01M 11/00–11/068
See application file for complete search history.

(56) References Cited

U.S. PATENT DOCUMENTS 10,110,879 B2  10/2018  Tian et al.
10,655,954 B2   5/2020  Wang et al.
(Continued)

FOREIGN PATENT DOCUMENTS

CN    100464152 C    2/2009
CN    101592476 A  * 12/2009  ............. G01B 11/24
(Continued)

OTHER PUBLICATIONS

Shanshan et al., "A high-accuracy nonlinear phase error compensation method," Opto-Electronic Engineering, Apr. 15, 2021, 8 pages, vol. 48, Issue No. 4, 200296-1.
(Continued)

*Primary Examiner* — Michael P LaPage
(74) *Attorney, Agent, or Firm* — Maschoff Brennan

(57) ABSTRACT

A calibration method of three-dimensional measurement system includes a projection device, a camera and a processor. The projection device projects structural light to a reference object including a first calibration surface and a second calibration surface. The camera photographs the reference object to obtain at least one reference object image. The processor performs decoding according to the at least one reference object image to obtain a plurality of pieces of phase data of the at least one reference object image. The processor computes a first phase corresponding to the first calibration surface and a second phase corresponding to the second calibration surface according to the phase data, calculates a surface phase difference between the first phase and the second phase, and computes according to the surface phase difference and a height of the second calibration surface relative to the first calibration surface to obtain a phase-height conversion parameter.

18 Claims, 13 Drawing Sheets

(56) References Cited

U.S. PATENT DOCUMENTS

| | | | |
|---|---|---|---|
| 2007/0177159 A1* | 8/2007 | Kim | G06T 7/521 |
| | | | 356/601 |
| 2010/0094135 A1 | 4/2010 | Fang-Yen et al. | |
| 2012/0019836 A1* | 1/2012 | Honma | G01B 11/2522 |
| | | | 356/603 |
| 2013/0128280 A1* | 5/2013 | Kim | G01B 11/28 |
| | | | 356/601 |
| 2013/0265585 A1 | 10/2013 | Fang-Yen et al. | |
| 2013/0278723 A1 | 10/2013 | Yu et al. | |
| 2014/0233038 A1* | 8/2014 | Maeda | G01B 9/02072 |
| | | | 356/513 |
| 2015/0260509 A1* | 9/2015 | Kofman | G01B 11/2513 |
| | | | 356/601 |
| 2015/0346027 A1 | 12/2015 | Khare et al. | |
| 2017/0191821 A1* | 7/2017 | Deck | G01B 11/30 |
| 2019/0094016 A1 | 3/2019 | Shigaki et al. | |
| 2019/0348463 A1 | 11/2019 | Na et al. | |
| 2020/0033455 A1 | 1/2020 | Inada et al. | |
| 2021/0063840 A1 | 3/2021 | Figeys et al. | |
| 2021/0088328 A1 | 3/2021 | Haugen et al. | |
| 2022/0107173 A1 | 4/2022 | He et al. | |
| 2023/0168081 A1* | 6/2023 | Gu | G06T 7/85 |
| | | | 356/603 |

FOREIGN PATENT DOCUMENTS

| | | |
|---|---|---|
| CN | 102506760 A | 6/2012 |
| CN | 104729429 B | 6/2017 |
| CN | 110230994 B | 8/2020 |
| TW | 202020468 A | 6/2020 |
| TW | I699525 B | 7/2020 |
| WO | 2019111453 A1 | 6/2019 |
| WO | 2020250571 A1 | 12/2020 |

OTHER PUBLICATIONS

Ten et al., "Full-Field 3-D Flip-Chip Solder Bumps Measurement Using DLP-Based Phase Shifting Technique," IEEE Transactions on Advanced Packaging, Nov. 28, 2008, pp. 830-840, vol. 31, Issue No. 4,.

Zhang et al., "Full-field phase error detection and compensation method for digital phaseshifting fringe projection profilometry," Measurement Science and Technology, Feb. 2, 2015, 8 pages, vol. 26, Issue No. 3, 035201.

TW Office Action in Application No. 110146320 Dated Nov. 3, 2022.

* cited by examiner

PHASE SHIFT-BASED THREE-DIMENSIONAL MEASUREMENT SYSTEM WITH MULTIPLE CALIBRATION SURFACES AND CALIBRATION METHOD THEREOF

CROSS-REFERENCE TO RELATED APPLICATIONS

This non-provisional application claims priority under 35 U.S.C. § 119 (a) on Patent Application No(s). 110146320 filed in Republic of China (ROC) on Dec. 10, 2021, the entire contents of which are hereby incorporated by reference.

BACKGROUND

1. Technical Field

This disclosure relates to a three-dimensional measurement based on phase shift, particularly to a three-dimensional measurement system and calibration method thereof.

2. Related Art

In the high-precision inspection of industrial manufacturing, a three-dimensional (3D) measurement system based on phase shift is often used. Because of the advantages of non-contact and high measurement accuracy, 3D measurement system may be used in semiconductor measurement, industrial product quality inspection, or 3D measurement of workpiece.

To take into account the production efficiency and quality of the product, a 3D measurement system may be configured on the production line to conduct real-time inspection of the product. To ensure the inspection accuracy on variety of product types, the 3D measurement system needs to be calibrated for different types of products. However, the existing calibration method is to send the 3D measurement system back to the laboratory or the original manufacturer for calibration. During calibration, a high-precision fine-tuning platform and special standard parts need to be used, and most of the conventional methods calibrate the system error by modifying the gamma value of the device or looking up table. The entire calibration process is complicated, time-consuming and inconvenient.

SUMMARY

Accordingly, this disclosure provides a three-dimensional measurement system based on phase shift and calibration method thereof. The three-dimensional measurement system of the present disclosure photographs a reference object having a first calibration surface and a second calibration surface to generate at least one reference object image, performs phase compensation on phase data in the at least one reference object image according the phase error model, and computes a phase-height conversion parameter according to the compensated phase data.

According to one or more embodiment of this disclosure, a calibration method of a three-dimensional measurement system comprises: projecting, by a projection device, structural light to a reference object, wherein the reference object comprises a first calibration surface and a second calibration surface; photographing, by a camera, the reference object to obtain at least one reference object image; performing, by a processor, decoding computation according to the at least one reference object image to obtain a plurality of pieces of phase data of the at least one reference object image; computing, by the processor, a first phase corresponding to the first calibration surface and a second phase corresponding to the second calibration surface according to the pieces of phase data; and calculating, by the processor, a surface phase difference between the first phase and the second phase, and performing computation according to the surface phase difference and a height of the second calibration surface relative to the first calibration surface to obtain a phase-height conversion parameter.

According to one or more embodiment of this disclosure, a three-dimensional measurement system based on phase shift comprises: a reference object comprising a first calibration surface and a second calibration surface; a projection device configured to project structural light to the reference object; a camera configured to photograph the reference object to obtain at least one reference object image; and a processor electrically connected to the camera and the projection device, wherein the processor is configured to perform: performing decoding computation according to the at least one reference object image to obtain a plurality of pieces of phase data of the at least one reference object image; computing a first phase corresponding to the first calibration surface and a second phase corresponding to the second calibration surface according to the pieces of phase data; and calculating a surface phase difference between the first phase and the second phase, and performing computation according to the surface phase difference and a height of the second calibration surface relative to the first calibration surface to obtain a phase-height conversion parameter.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
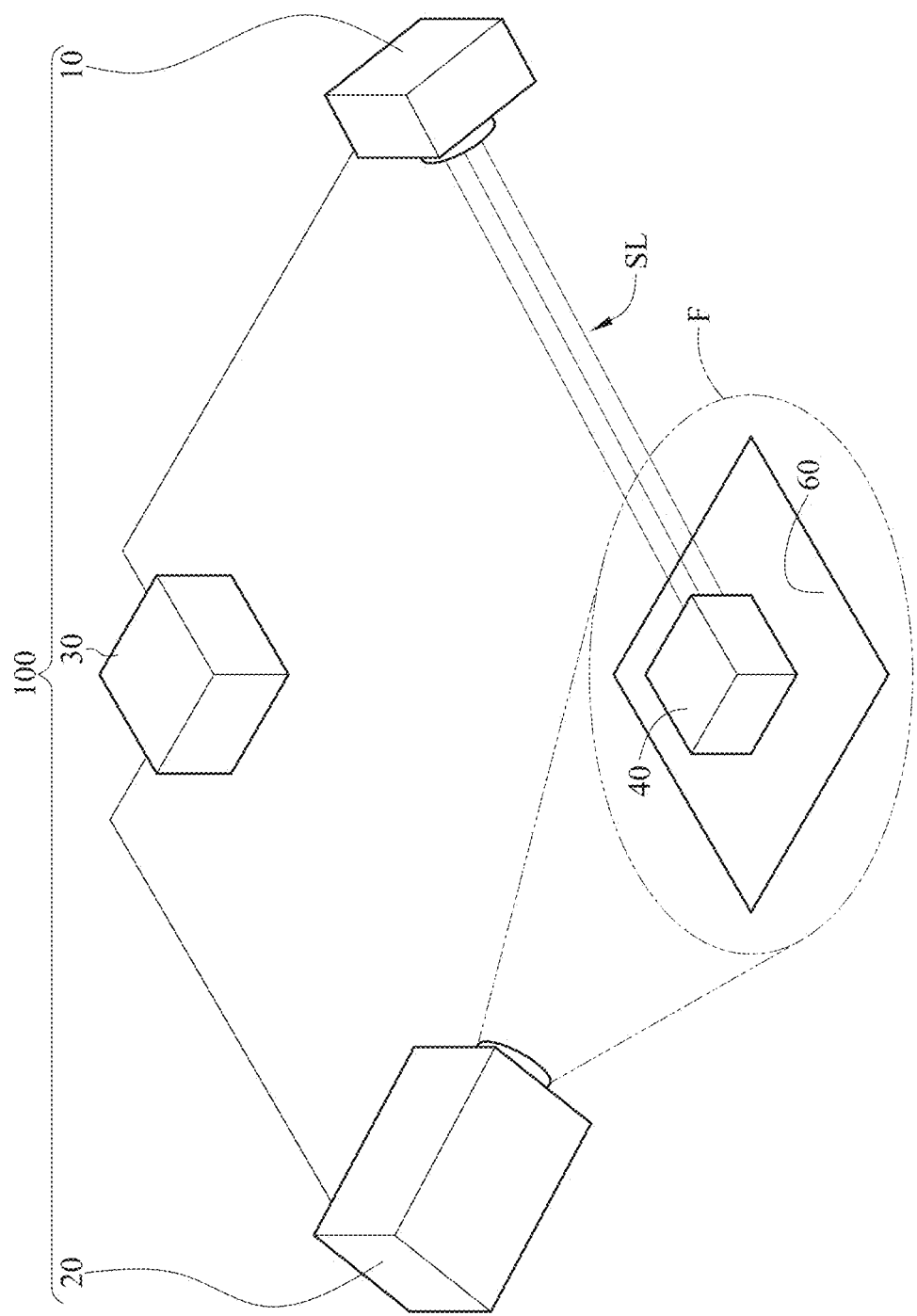
FIG. 1 is a schematic block diagram of a three-dimensional measurement system of an embodiment of the disclosure.

FIG. 1 is a schematic block diagram of a three-dimensional measurement system of an embodiment of the disclosure. This system is adapted to measure a height of a target object 40, wherein the target object 40 is disposed at a reference surface 60. As shown in FIG. 1, a three-dimensional (3D) measurement system 100 based on phase shift includes a projection device 10, a camera 20 and a processor 30. The projection device 10 is configured to project structural light SL to the target object 40. The camera 20 is configured to photograph the target object 40 to generate a target image. A field of view (FOV) F of the camera 20 has to include the reference surface 60 and the target object 40, and an angle of photographing of the camera 20 may be adaptively adjusted according to a location and a size of the target object 40. The reference surface 60 of the embodiment is a flat surface, but in other embodiments, the reference surface may also be a surface or curved surface of non-uniform height, the reference surface is not limited by the surface of the embodiment.

Generally, the principle of 3D measurement based on phase shift is through projecting the structural light SL (for example, texture image, phase fringe or grating image) to the surface of the target object 40, collecting fringe data of reflection of the surface of the target object 40, then calculating height information of the surface of the target object 40 with trigonometry. Through a phase-height conversion parameter k, the height information may be calculated with phase information in the target image, as shown by equation (1) below.

$$h(x, y) = \frac{L}{1 + \frac{2\pi d}{\Delta\emptyset(x, y)P}} \approx k \cdot \Delta\emptyset(x, y) \quad \text{Equation (1)}$$

Assuming the reference surface 60 is located on a x-y plane, h(x, y) represents a height at the coordinate (x, y), P represents a periodic length of the structural light SL, d represents a distance between the projection device 10 and the camera 20, L represents a distance between the camera 20 and the reference surface 60, k represents the phase-height conversion parameter, and $\Delta\emptyset(x, y)$ represents a phase-shift of the target object 40 and the reference surface 60 at the coordinate (x, y). The disclosure provides a method of generating the phase-height conversion parameter k in a faster way, and a method and system of calculating object height using the phase-height conversion parameter k.

As shown in FIG. 1, the processor 30 is electrically connected to the projection device 10 and the camera 20 to control the projection device 10 emitting the structural light SL and control the camera 20 photographing the target image. The processor 30 is configured to execute commands, for example, to execute a plurality of first commands according to the target image to calculate the height of the target object 40, wherein the corresponding process of these first commands are shown in FIG. 2.

Figure 2:
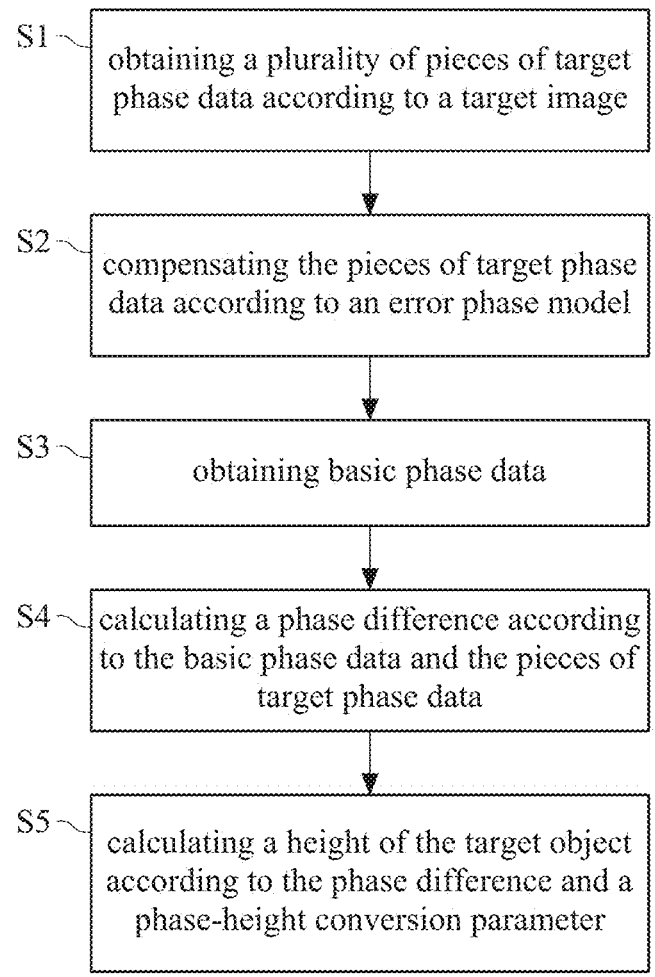
FIG. 2 is a flowchart of a three-dimensional measurement system based on phase shift of an embodiment of the disclosure.

FIG. 2 is a flowchart of a three-dimensional measurement system based on phase shift of an embodiment of the disclosure. Step S1 is "obtaining a plurality of pieces of target phase data according to the target image", step S2 is "compensating the pieces of target phase data according to an error phase model", step S3 is "obtaining basic phase data", step S4 is "calculating a phase difference according to the basic phase data and the pieces of target phase data", and step S5 is "calculating the height of the target object according to the phase difference and the phase-height conversion parameter".

Figure 3A:
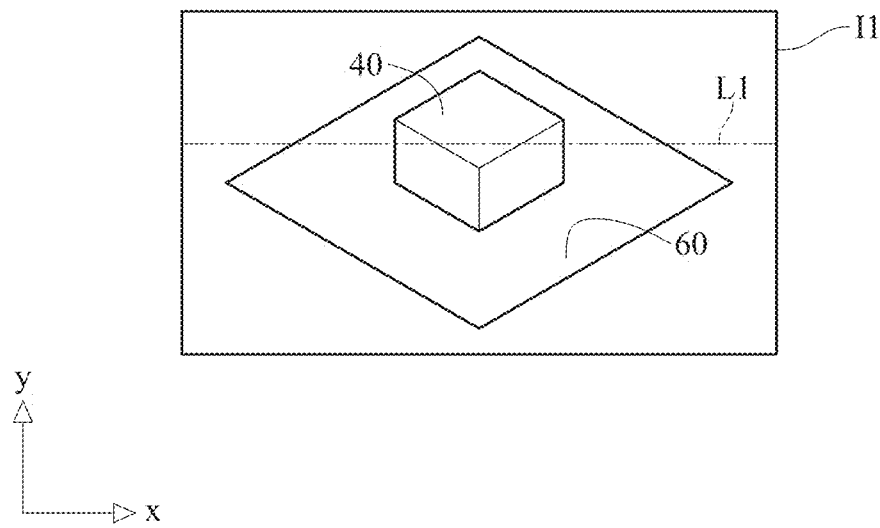
FIG. 3A is an example of a target image.
Figure 3B:
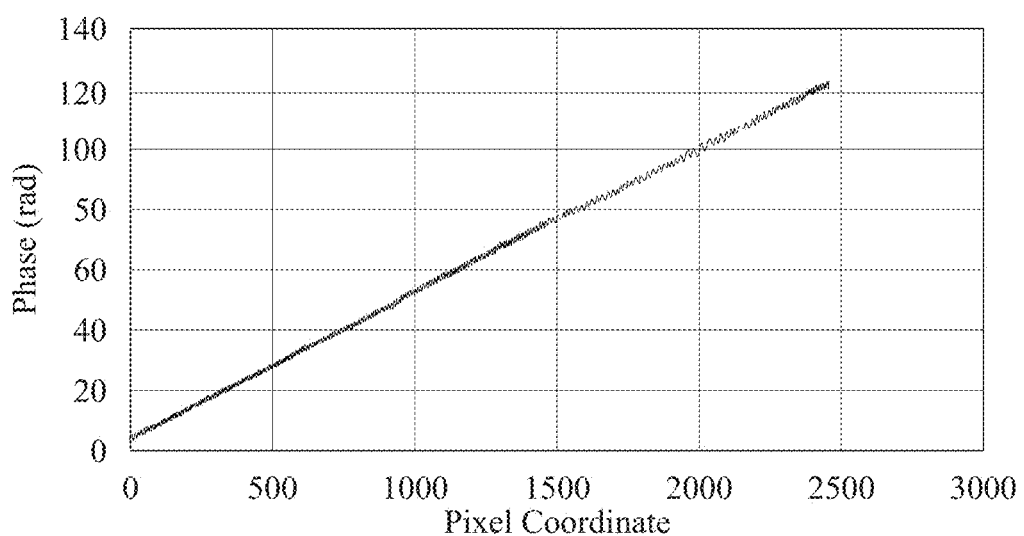
FIG. 3B is an example of an absolute phase diagram.

FIG. 3A is an example of the target image I1. In step S1, the processor 30 may generate a plurality of scan lines, wherein one of the scan lines is the scan line L1 shown in FIG. 3A passing through the reference surface 60 and the target object 40. The processor 30 obtains a plurality of pieces of target phase data described in step S1 from the scan line L1. An absolute phase diagram shown in FIG. 3B may be illustrated according to these pieces of target phase data, wherein the horizontal axis represents the coordinate of X direction, and vertical axis represents the phase with a unit of radian.

After step S1, step S2 is performed. That is, step S2 is performed after the processor 30 obtaining the pieces of target phase data according to the target image I1. In step S2, the processor 30 compensates these pieces of target phase data based on a phase error model. The phase error model reflects an error between measured target phase and ideal phase. This phase error model has to be built before step S2, wherein the method of building the phase error model is described below. In addition, in another embodiment, step S2 may also be omitted for step S1 to be directly followed by step S3.

After step S2, that is, the processor 30 performs step S3 after compensating the pieces of target phase data according to the phase error model. In an embodiment of step S3, the processor 30 obtains pre-stored basic phase data. In detail, before the target object 40 is disposed at the reference surface 60, the camera 20 photographs the reference surface 60 to generate the reference surface image in advance, and the processor 30 performs decoding computation according to this reference surface image to obtain a plurality of pieces of phase data of the reference surface image, the processor 30 then compensating pieces of phase data of the reference surface image to generate the basic phase data with an error calibration model. Therefore, in step S3, the processor 30 may obtain the basic phase data generated in advance. In another embodiment of step S3, the reference surface 60 may also be photographed according to the above process to generate the latest basic phase data in real time, the disclosure is not limited thereto.

Step S4 is "calculating the phase difference according to the basic phase data and the pieces of target phase data". In detail, as illustrated as the schematic diagram shown in FIG. 3C, a plurality of pieces of phase data in the basic phase data and a plurality of pieces of data in the pieces of target phase data are subtracted to obtain a plurality of phase difference data according to the coordinate of the same pixel. According to a size of the phase difference, FIG. 3C may be approximately divided into two parts: one being the coordinates 0~900 and the coordinates 1600~2500 corresponding to area in the reference image I1 not having the target object 40, and one being the coordinates 900~1600 corresponding to area in the reference image I1 having the target object 40.

Figure 3C:
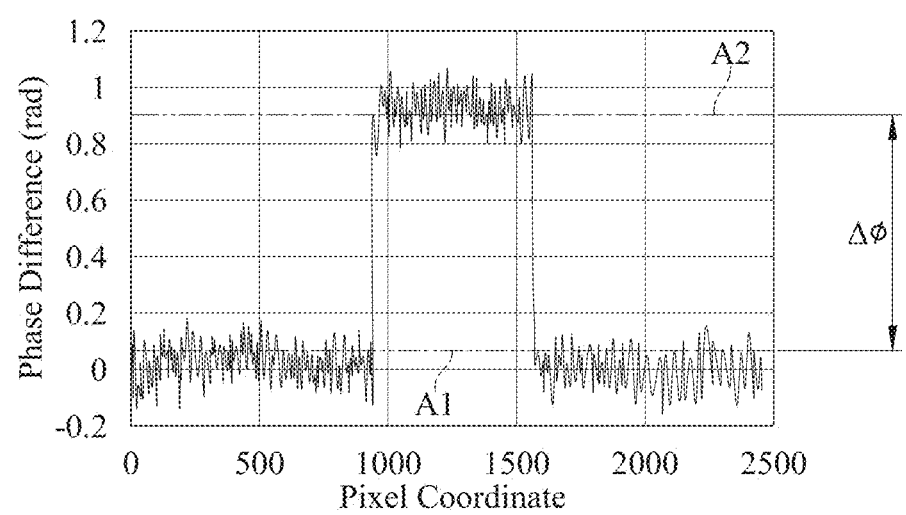
FIG. 3C is an example of a phase difference diagram of a target object.

In step S5, as shown by equation (1) and FIG. 3C, the processor 30 calculates a product of the phase difference $\Delta\emptyset$ multiplied with the phase-height conversion parameter k as the height h of the target object 40. According to the process of steps S1~S5, the processor 30 may calculate the height of each point in the target image I1, thereby building a point cloud model of the target object 40 according to the pieces of height information.

Figure 4:
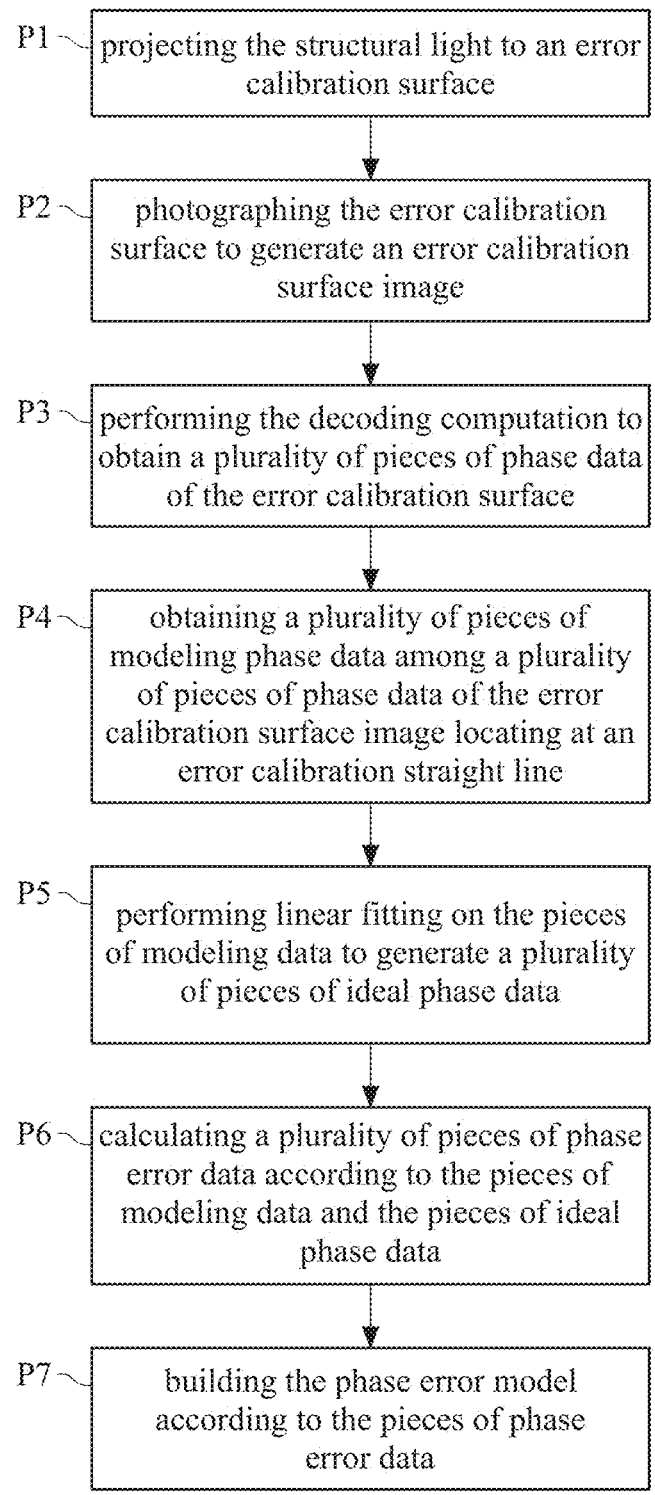
FIG. 4 is a flowchart of building a phase error model of an embodiment of the disclosure.

Regarding the method of building the phase error model described in step S2, in detail, the processor 30 is configured to execute commands, such as a plurality of second commands to generate the phase error model, wherein the process that these second commands correspond to are shown in FIG. 4.

FIG. 4 is a flowchart of building a phase error model of an embodiment of the disclosure. Step P1 is "projecting the structural light to an error calibration surface", step P2 is "photographing the error calibration surface to generate an error calibration surface image", step P3 is "performing the decoding computation to obtain a plurality of pieces of phase data of the error calibration surface", step P4 is "obtaining a plurality of pieces of modeling phase data among a plurality of pieces of phase data of the error calibration surface image locating at an error calibration straight line", step P5 is "performing linear fitting on the pieces of modeling data to generate a plurality of pieces of ideal phase data", step P6 is "calculating a plurality of pieces of phase error data according to the pieces of modeling data and the pieces of ideal phase data", and step P7 is "building the phase error model according to the pieces of phase error data".

In step P1 and step P2, the processor 30 executing second commands controls the projection device 10 and the camera 20 perform the corresponding operations, respectively. In step P1, the structural light is periodic structural light, and a phase of the structural light increases along an extension direction.

Figure 5A:
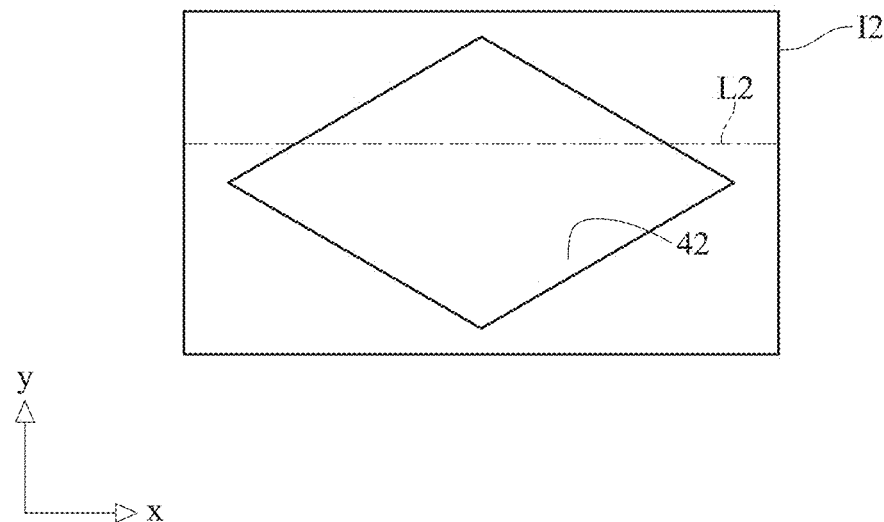
FIG. 5A is an example of an error calibration surface image.
Figure 5B:
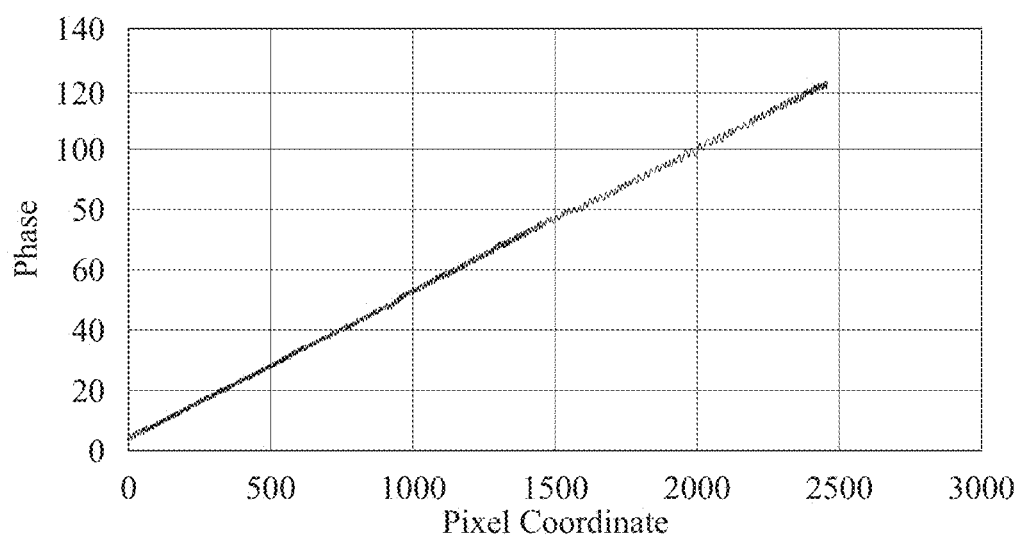
FIG. 5B is an example of modeling data.

FIG. 5A is an example of the error calibration surface image I2, FIG. 5B is an example of the pieces of modeling data. In an embodiment of step P3, the processor 30 performs the decoding computation according to the error calibration surface image I2 to obtain a plurality of pieces of phase data corresponding to the error calibration surface 42. In step P4, the processor 30 obtains a plurality of pieces of modeling phase data locating at the error calibration straight line from a plurality of pieces of phase data in the error calibration surface image I2 according to an error calibration straight line in the error calibration surface image I2 that is parallel to the extension direction. The processor 30 generates a scan line L2 (the error calibration straight line) in the error calibration surface image I2 shown in FIG. 5A, and this scan line L2 (the error calibration straight line) has to pass through the error calibration surface 42 and has a slope characteristic as shown in FIG. 5B: on this scan line L2, distribution directions of phases a plurality of pieces of modeling data are increasing (equivalent to being parallel to the extension direction of the phase of the structural light). In other words, when a coordinate of a pixel of a piece of modeling data increases, its phase value also increases. Overall, step P3 is: in the error calibration surface image I2, the processor 30 obtains a plurality of pieces of modeling data according to a straight line (the scan line L2, that is, the error calibration straight line) with increasing in the direction of phase distribution.

Figure 5C:
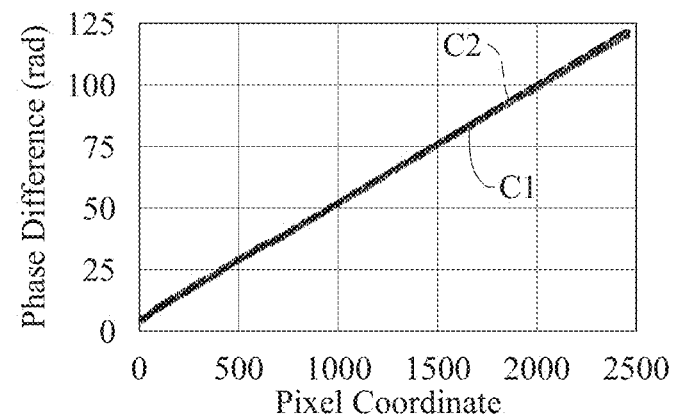
FIG. 5C is an example of ideal phase data.

Since the error calibration surface 42 is a flat surface with no changes in height, ideally, the phase data corresponding to this error calibration surface 42 should show a linear increase. However, the hardware elements in the projection device 10 or the camera 20 may lead to error during measurement, causing the phase data corresponding to the error calibration surface 42 not in a perfect linear increasing. Therefore, in step P5, the processor 30 performs the linear fitting. In an embodiment, the processor 30, for example, uses a least squares method according to the pieces of modeling data to generate the pieces of ideal phase data. FIG. 5C is an example of generating the pieces of ideal phase data using the least squares method, wherein the curve C1 with slight oscillation is the pieces of modeling data, straight line C2 is the pieces of ideal phase data. It should be noted that, the error calibration surface 42 of the embodiment is the same surface as the reference surface 60 in step S1~S7, but in other embodiments, the error calibration surface 42 and the reference surface 60 in step S1~S7 may also be different surfaces.

Figure 5D:
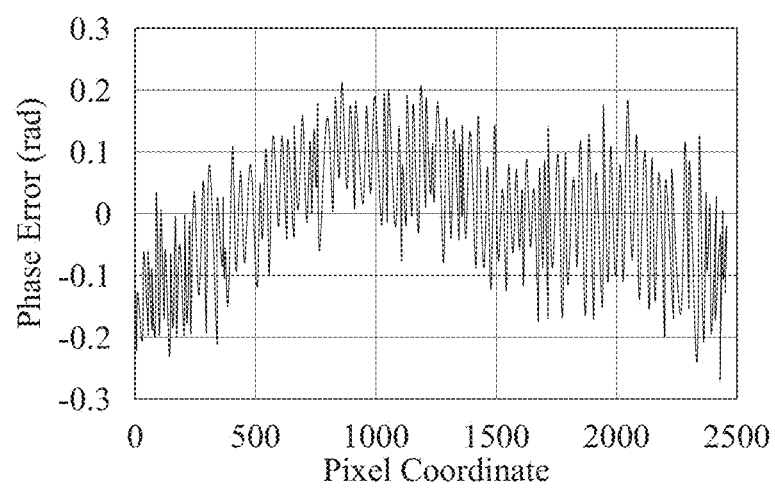
FIG. 5D is an example of phase error data.

In an embodiment of step P6, for each pixel coordinate, the processor 30 calculates a difference value between an ideal phase and an actual phase as a piece of phase error data, wherein FIG. 5D is an example of generating the pieces of phase error data with the above method.

Figure 5E:
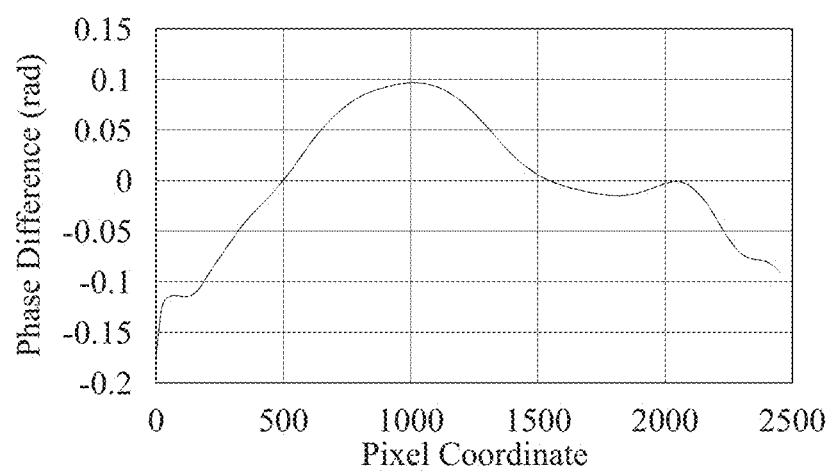
FIG. 5E is an example of a phase error model.

In an embodiment of step P7, the processor 30 performs Fourier analysis and low-pass filtering on the pieces of phase error data to build the phase error model. FIG. 5E is an example of building the phase error model with the above method, wherein this phase error model may be used to compensate the pieces of target phase data in step S2.

In an embodiment, in the process of steps P1~P7 described above further includes a step of horizontal calibration. In detail, the processor 30 computing the first phase corresponding to the first calibration surface and the second phase corresponding to the second calibration surface according to the phase data further includes: according to a reference straight line in the at least one reference object image passing through the first calibration surface and the second calibration surface, the processor 30 obtains a plurality of pieces of reference phase data among the pieces of phase data locating at the reference straight line; the processor 30 obtains at least one group of phase data from the pieces of reference phase data, wherein the at least one group of phase data comprises at least two pieces of the pieces of reference phase data, and the at least one group of phase data corresponds to the first calibration surface or the second calibration surface; the processor 30 performs horizontal calibration on the pieces of phase data according to the at least one group of phase data; and the processor 30 computes the first phase corresponding to the first calibration surface and the second phase corresponding to the second calibration surface according to the pieces of reference phase data after performed with the horizontal calibration.

Figure 6:
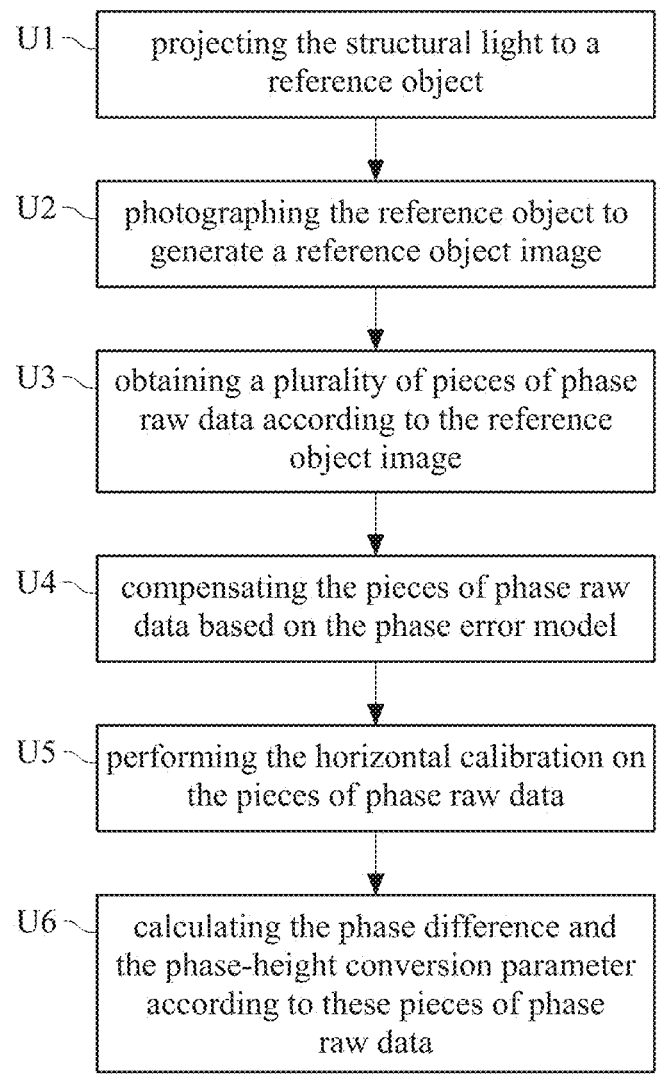
FIG. 6 is a flowchart of a method of generating phase-height conversion parameter of an embodiment of the disclosure.

Regarding the method of generating the phase-height conversion parameter k described in step S5, in detail, the processor 30 is configured to execute commands, for example, to execute a plurality of third commands to generate the phase-height conversion parameter k, wherein the process corresponding to these third commands are shown in FIG. 6. FIG. 6 is a flowchart of calibration method of three-dimensional measurement system of an embodiment of the disclosure, wherein this method is for generating the phase-height conversion parameter k. Step U1 is "projecting the structural light to a reference object", step U2 is "photographing the reference object to generate a reference object image", step U3 is "obtaining a plurality of pieces of phase raw data according to the reference object image", step U4 is "compensating the pieces of phase raw data based on the phase error model", step U5 is "performing the horizontal calibration on the pieces of phase raw data", and step U6 is "calculating the phase difference and the phase-height conversion parameter according to these pieces of phase raw data".

Figure 7:
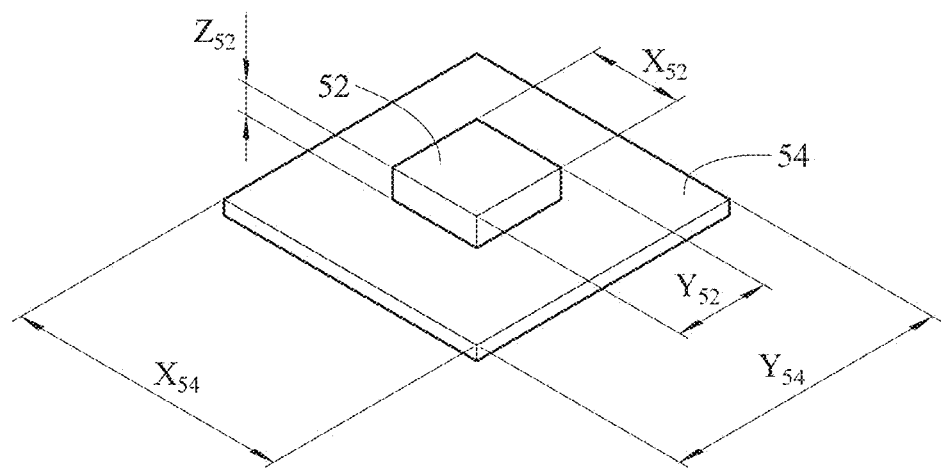
FIG. 7 is an example of a reference object.

In step U1 and step U2, the processor 30 executing third commands controls the projection device 10 to the camera 20 to perform corresponding operations, respectively. FIG. 7 is an example of the reference object 50. In step U1, the reference object 50 includes the first calibration surface and the second calibration surface. In an embodiment, the reference object 50 includes a step height block 52 and a substrate 54, and the step height block 52 is disposed on the substrate 54. The first calibration surface is an upper surface (top surface) of the step height block 52, and the second calibration surface is an upper surface (top surface) of the substrate 54. In step U2, the camera 20 photographs the reference object 50 to obtain at least one reference object image, the disclosure does not limit the number of reference object images. In an embodiment, the same structural light pattern may be presented in different phases. Therefore, in steps U1 to U2, the projection device 10 may project structural light with different phases, and the camera 20 obtains image one by one.

In an embodiment, a plurality of attributes of the step height block 52 and the substrate 54 may be adjusted according to requirements, wherein these attributes includes: a size of a top surface of the step height block 52 (may be represented by $X_{52}$, $Y_{52}$), a height difference $Z_{52}$ of the step height block 52 relative to the substrate 54, a number of the step height block 52, a location of the step height block 52 disposed on the substrate 54, and a size of a top surface of the substrate 54 (may be represented by $X_{54}$, $Y_{54}$).

Regarding the sizes of the top surfaces $X_{52}$, $Y_{52}$ of the step height block 52, in an embodiment of the reference object image in step U2, the length $X_{52}$ and width $Y_{52}$ of the top surface of the step height block 52 are both at least 20 pixels, but the disclosure is not limited to the above numbers. In practice, a distance between the lens of the camera 20 and the step height block 52 as well as photographing angle may be adaptively adjusted according to a plurality of parameters (for example, focal length of the camera, the resolution of the reference object image), for the sizes of the top surfaces $X_{52}$, $Y_{52}$ of the step height block 52 in the reference object image exceed default values.

Regarding the height difference $Z_{52}$ of the step height block 52 relative to the substrate 54, its value depends on the Z-axis measurement precision required by the 3D measurement system 100. In an embodiment, the height difference $Z_{52}$ is more than 10 times of the measurement precision. For example, if the precision is 1 micrometer (μm), the height difference $Z_{52}$ must be greater than or equal to 10 micrometers.

Figure 8:
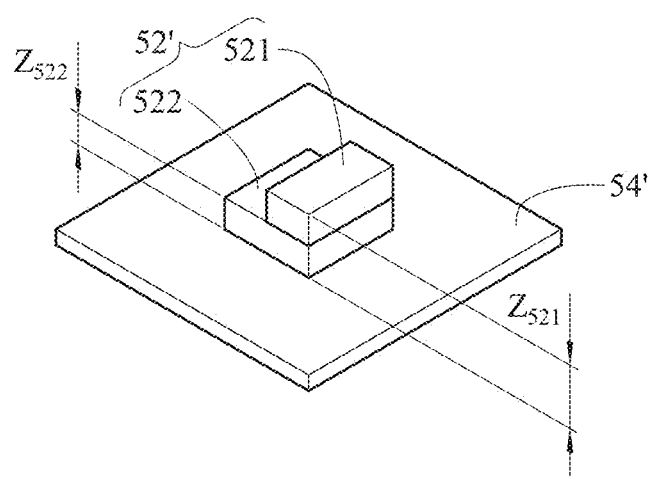
FIG. 8 is another example of a reference object.

FIG. 8 is an example of the reference object 50' having two step height blocks 521, 522. As shown in FIG. 8, the step height block 522 is disposed on the substrate 54', and the step height block 521 is disposed on the step height block 522. The size of the top surface of the step height block 521 is smaller than the size of the top surface of the step height block 522. In a different perspective, the two step height blocks 521, 522 compose a two-level step height block 52' as a whole. Therefore, the step height block 52' has two height differences $Z_{521}$, $Z_{522}$ relative to the substrate 54. The disclosure does not limit the number of the step height block (height levels). Under the premise of not significantly affecting calibration speed, higher number (number of steps) of step height blocks may increase the precision of calibration.

Regarding the location of the step height block 52 disposed on the substrate 54, the disclosure is not limited thereto.

Regarding the sizes of the top surfaces $X_{54}$, $Y_{54}$ of the substrate 54, please refer to FIG. 7. In detail, the processor 30 may find an image region in the reference object image corresponding to the substrate 54. In an embodiment, a size of this image region is at least ⅔ of the size of the reference object image. In other words, the length and width of the substrate 54 is at least ⅔ of the field of view F of the 3D measurement system 100. The disclosure is not limited to the above values, and does not limit the shape of the substrate 54 being rectangle.

In step U3, the processor 30 performs the decoding computation to obtain a plurality of pieces of phase raw data of the at least one reference object image according to the at least one reference object image, wherein the method of performing the decoding computation to obtain a plurality of pieces of phase raw data is basically the same as the processor 30 obtaining a plurality of pieces of modeling data according to the error calibration surface image I2 in step P3, the same process is not repeated herein.

In step U4, the processor 30 uses the phase error model built in step P7 to compensate a plurality of pieces of phase raw data of the at least one reference object image. In other words, step P7 has to be executed completely before step U4. In an embodiment, step U4 may be omitted for step U5 to be directly followed by step U3.

In step U5, the method of the processor 30 performing horizontal calibration on the pieces of phase raw data is basically the same as the processor 30 performing horizontal calibration on the pieces of target phase data in step S3, the same process is not repeated herein.

In step U6, the processor 30 computes the first phase corresponding to the first calibration surface and the second phase corresponding to the second calibration surface according to (calibrated and after horizontal calibration) the pieces of phase raw data. In an embodiment, the processor 30 obtains a plurality of the pieces of reference phase data locating at the reference straight line from these pieces of phase raw data according to a reference straight line in the at least one reference object image passing through the first calibration surface and the second calibration surface. The processor 30 computes the first phase corresponding to the first calibration surface and the second phase corresponding to the second calibration surface according to these pieces of reference phase data. In practice, the concept of the above-mentioned reference straight line is similar to the scan line L1 passing through the error calibration surface 42 and the target object 40 shown in FIG. 3A. In an embodiment, the first phase is an average of a plurality of the pieces of reference phase data of the first calibration surface, and the second phase is an average of a plurality of pieces of reference phase data of the second calibration surface.

Figure 9:
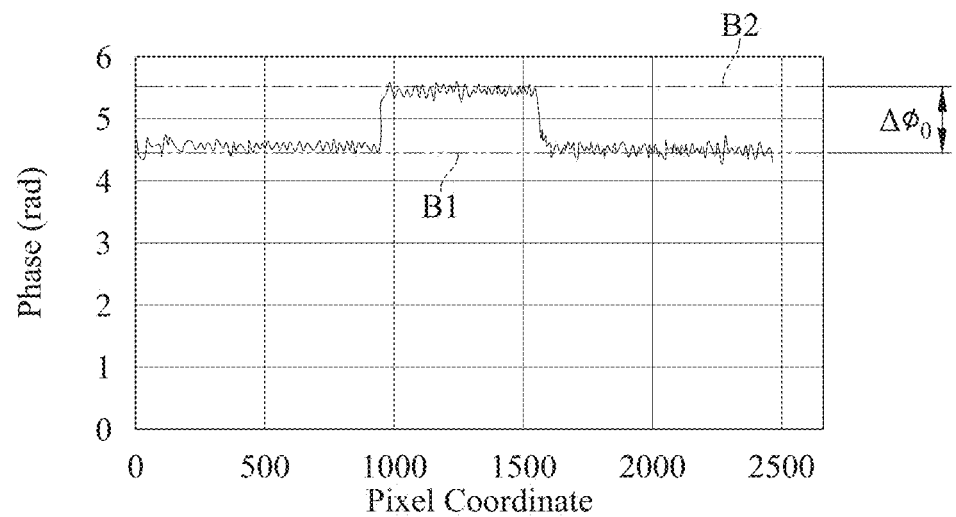
FIG. 9 is an example of a phase difference diagram of the reference object.

The processor 30 calculates a surface phase difference between the first phase and the second phase, then calculates a height of the second calibration surface relative to the first calibration surface according to the surface phase difference to obtain the phase-height conversion parameter k, wherein the method of calculating the phase difference is similar to step S4. Please refer to FIG. 9, wherein FIG. 9 is a schematic diagram of the phase difference $\Delta\varnothing_0$ of the step height block 52. The phase difference $\Delta\varnothing_0$ is associated with the first phase B1 and the second phase B2, the first phase B1 is associated with phase data corresponding to the substrate 54 among a plurality of pieces of phase data, the second phase B2 is associated with a plurality of pieces of phase data corresponding to the step height block 52 among a plurality of pieces of phase data, and the phase-height conversion parameter k is associated with the height $Z_{52}$ of the step height block 52 and the phase difference $\Delta\varnothing_0$.

In an embodiment, the phase difference is a difference value of $\Delta\emptyset_0$ the first phase B1 and the second phase B2. That is, $\Delta\emptyset_0$=B2−B1.

In an embodiment, the first phase B1 corresponds to the average of a plurality of pieces of phase data of the substrate 54 and corresponds to a plurality of pieces of phase data of the substrate 54, for example, phase data of the coordinates 0~900 and phase data of the coordinates 1600~2500. The second phase B2 is the average of a plurality of pieces of phase data corresponding to the step height block 52 and corresponds to a plurality of pieces of phase data of the step height block 52, for example, phase data of the coordinates 900~1600.

In an embodiment, the phase-height conversion parameter k is a quotient of the height of the second calibration surface relative to the first calibration surface divided by the surface phase difference. In an embodiment, the phase-height conversion parameter k is a quotient of the height $Z_{52}$ of the step height block 52 divided by the phase difference $\Delta\emptyset_0$, that is, $$k = \frac{Z_{52}}{\Delta\emptyset_0}.$$

After calculating the phase-height conversion parameter k, the phase-height conversion parameter k may be used in step S5 in FIG. 2 to calculate the height of the target object 40.

Figure 10:
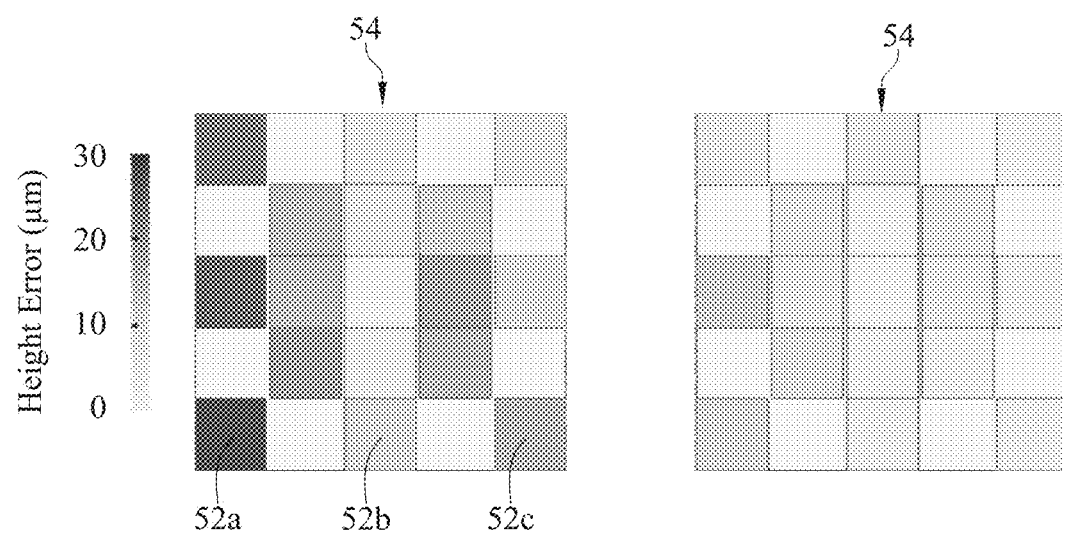
FIG. 10 is a comparison of the height error heatmaps of the step height blocks at different locations before and after compensation.
Figure 11A:
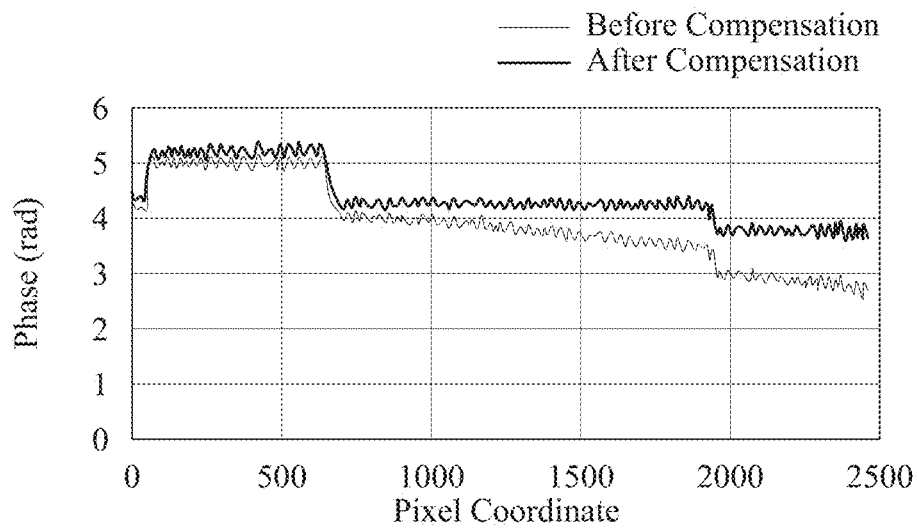
FIGS. 11A-11C are examples of phase error data before and after compensation.
Figure 11B:
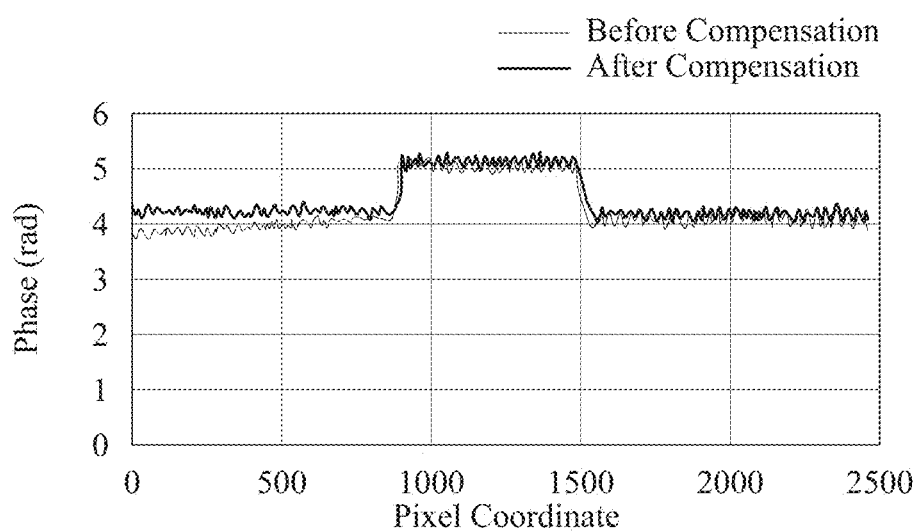
Figure 11C:
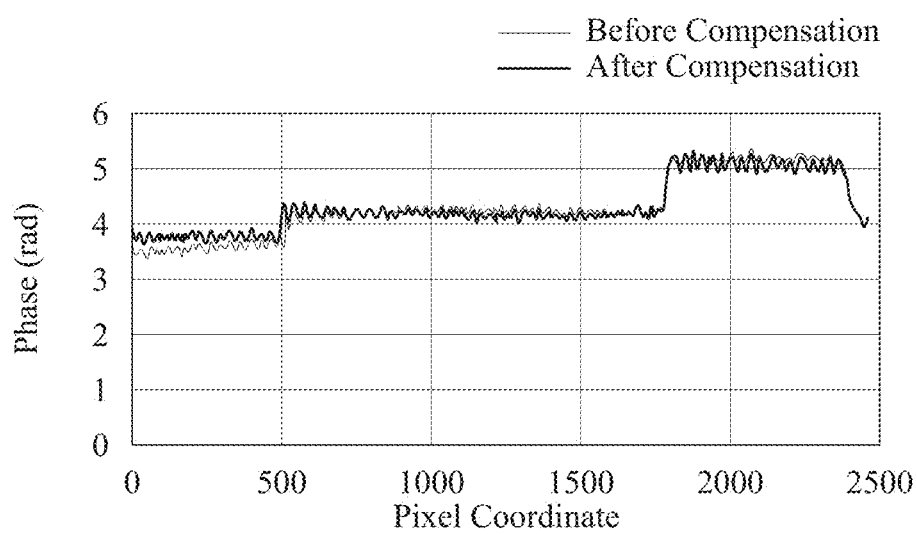

In the process shown in FIG. 6, to elaborate the advantageous effects of the phase error model, please refer to FIG. 10. FIG. 10 is a comparison of the height error heatmaps of the step height blocks at different locations before and after compensation. The unit of the height error in FIG. 10 is micrometer (μm), and FIGS. 11A to 11C are examples of the pieces of phase error data before and after compensation.

FIG. 10 shows the substrate 54 before and after compensation in a top view, and the grids in the substrate 54 represent a plurality of allowed locations for disposing the step height block 52. When the step height block 52 is disposed on the locations 52a, 52b, 52c of the substrate 54, the phase diagram examples of before and after compensation are respectively shown in FIG. 11A, FIG. 11B and FIG. 11C. It may be known according to two heatmaps of height errors shown in FIG. 10 that: before performing compensation using the phase error model in step S2 or step U4, if the step height block 52 is disposed at the corner of the substrate 54, the calculated height of the target object 40 has a relative large measurement error; after performing compensation using the phase error model in step S2 or step U4, not matter which location of the substrate 54 the step height block 52 is disposed at, the calculated height of the target object 40 has the same error. This means the phase-height conversion parameter k generated with an embodiment of the disclosure is adapted to the entire field of view F that may be photographed by the camera 20.

Please refer to FIG. 1 and FIG. 7. In an embodiment, the disclosure provides a 3D measurement system based on phase shift, said system includes: the reference object 50, the projection device 10, the camera 20 and the processor 30. The reference object 50 includes the first calibration surface (for example, the top surface of the step height block 52) and the second calibration surface (for example, the top surface of the substrate 54). The projection device 10 is configured to project the structural light SL to the reference object 50. The camera 20 is configured to photograph the reference object 50 to obtain the at least one reference object image. The processor 30 is electrically connected to the camera 20 and the projection device 10, wherein the processor 30 is configured to: performing the decoding computation according to the at least one reference object image to obtain a plurality of pieces of phase data of the at least one reference object image; calculating the first phase corresponding to the first calibration surface and the second phase corresponding to the second calibration surface according to these pieces of phase data; and calculating the surface phase difference between the first phase and the second phase, and calculating the height of the second calibration surface relative to the first calibration surface according to the surface phase difference to obtain the phase-height conversion parameter k.

In view of the above description, the disclosure provides a three-dimensional measurement system based on phase shift, height measuring method and method of generating phase-height conversion parameter. The disclosure may only need to photograph the reference object image of a single step height block and use the phase data in the reference object image to generate the phase-height conversion parameter needed for the following calibration. The generation of the phase-height conversion parameter is fast and is suitable for the entire picture. No matter which location the step height block is disposed at, the phase-height conversion parameter generated through the application of the disclosure has stability. In addition, the phase error model provided by the disclosure may perform adaptive phase compensation on the 3D measurement system, reduce phase error and improve accuracy when building 3D point cloud model.

What is claimed is:

1. A calibration method of a three-dimensional measurement system, comprising:

emitting, by the projector, structural light to a reference object, wherein the reference object comprises a first calibration surface and a second calibration surface;

photographing, by a camera, the reference object exposed to the structural light to obtain at least one reference object image;

obtaining, by a processor, a plurality of pieces of phase data of the at least one reference object image according to the at least one reference object image;

computing, by the processor, a first phase corresponding to the first calibration surface and a second phase corresponding to the second calibration surface according to the pieces of phase data; and calculating, by the processor, a surface phase difference between the first phase and the second phase, and performing computation according to the surface phase difference and a height of the second calibration surface relative to the first calibration surface to obtain a phase-height conversion parameter;

wherein computing, by the processor, the first phase corresponding to the first calibration surface and the second phase corresponding to the second calibration surface according to the pieces of phase data comprises:

according to a reference straight line in the at least one reference object image passing through the first calibration surface and the second calibration surface, obtaining, by the processor, a plurality of pieces of reference phase data among the pieces of phase data locating at the reference straight line; and computing, by the processor, the first phase corresponding to the first calibration surface and the second phase corresponding to the second calibration surface according to the pieces of reference phase data.

2. The calibration method of the three-dimensional measurement system according to claim 1, wherein computing, by the processor, the first phase corresponding to the first calibration surface and the second phase corresponding to the second calibration surface according to the pieces of phase data comprises:
according to a reference straight line in the at least one reference object image passing through the first calibration surface and the second calibration surface, obtaining, by the processor, a plurality of pieces of reference phase data among the pieces of phase data locating at the reference straight line;
obtaining, by the processor, at least one group of phase data from the pieces of reference phase data, wherein the at least one group of phase data comprises at least two pieces of the pieces of reference phase data, and the at least one group of phase data corresponds to the first calibration surface or the second calibration surface;
performing, by the processor, horizontal calibration on the pieces of phase data according to the at least one group of phase data; and
computing, by the processor, the first phase corresponding to the first calibration surface and the second phase corresponding to the second calibration surface according to the pieces of reference phase data after performed with the horizontal calibration.

3. The calibration method of the three-dimensional measurement system according to claim 1, wherein the structural light is periodic structural light, a phase of the structural light increases along an extension direction, and the calibration method further comprises:
emitting, by the projector, the structural light to an error calibration surface;
photographing, by the camera, the error calibration exposed to the structural light surface to generate an error calibration surface image;
obtaining, by the processor, a plurality pieces of phase data of the error calibration surface image according to the error calibration surface;
according to an error calibration straight line in the error calibration surface image parallel to the extension direction, obtaining, by the processor, a plurality of pieces of modeling phase data among the pieces of phase data of the error calibration surface image locating at the error calibration straight line;
performing, by the processor, linear fitting on the pieces of modeling phase data to generate a plurality of pieces of ideal phase data;
calculating, by the processor, a plurality of pieces of phase error data according to the pieces of modeling phase data and the pieces of ideal phase data; and
building, by the processor, a phase error model according to the pieces of phase error data.

4. The calibration method of the three-dimensional measurement system according to claim 3, wherein obtaining, by the processor, the pieces of phase data according to the error calibration surface comprises:
generating, by the processor, a plurality of pieces of phase raw data according to the at least one reference object image; and
performing, by the processor, phase compensation on the pieces of phase raw data based on the phase error model to obtain the pieces of phase data of the reference object image.

5. The calibration method of the three-dimensional measurement system according to claim 3, wherein the linear fitting is a least square method.

6. The calibration method of the three-dimensional measurement system according to claim 3, wherein building, by the processor, the phase error model according to the pieces of phase error data comprises:
performing, by the processor, Fourier analysis and low-pass filtering on the pieces of phase error data to build the phase error model.

7. The calibration method of the three-dimensional measurement system according to claim 1, wherein the reference object comprises a substrate and a step height block disposed on the substrate, the first calibration surface is a top surface of the substrate, and the second calibration surface is a top surface of the step height block.

8. The calibration method of the three-dimensional measurement system according to claim 7, wherein the reference object image has an image region corresponding to the substrate, and a size of the image region is at least ⅔ of the reference object image.

9. The calibration method of the three-dimensional measurement system according to claim 1, wherein
the first phase is an average of the pieces of reference phase data of the first calibration surface;
the second phase is an average of the pieces of reference phase data of the second calibration surface; and
the phase-height conversion parameter is a quotient of the height of the second calibration surface relative to the first calibration surface divided by the surface phase difference.

10. A three-dimensional measurement system based on phase shift, comprising:
a reference object comprising a first calibration surface and a second calibration surface;
a projector configured to emit structural light to the reference object;
a camera configured to photograph the reference object exposed to the structural light to obtain at least one reference object image; and
a processor electrically connected to the camera and the projector, wherein the processor is configured to perform:
obtaining a plurality of pieces of phase data of the at least one reference object image according to the at least one reference object image;
computing a first phase corresponding to the first calibration surface and a second phase corresponding to the second calibration surface according to the pieces of phase data; and
calculating a surface phase difference between the first phase and the second phase, and performing computation according to the surface phase difference and a height of the second calibration surface relative to the first calibration surface to obtain a phase-height conversion parameter;
wherein the processor is further configured to perform:
according to a reference straight line in the at least one reference object image passing through the first calibration surface and the second calibration surface, obtaining a plurality of pieces of reference phase data among the pieces of phase data locating at the reference straight line, wherein the first phase corresponding to the first calibration surface and the second phase corresponding to the second calibration surface are computed by the processor according to the pieces of reference phase data.

11. The three-dimensional measurement system based on phase shift according to claim 10, wherein the processor is further configured to perform:

according to a reference straight line in the at least one reference object image passing through the first calibration surface and the second calibration surface, obtaining a plurality of pieces of reference phase data among the pieces of phase data locating at the reference straight line;

obtaining at least one group of phase data from the pieces of reference phase data, wherein the at least one group of phase data comprises at least two pieces of the pieces of reference phase data, and the at least one group of phase data corresponds to the first calibration surface or the second calibration surface; and performing horizontal calibration on the pieces of phase data according to the at least one group of phase data;

wherein the first phase corresponding to the first calibration surface and the second phase corresponding to the second calibration surface are computed by the processor according to the pieces of reference phase data after performed with the horizontal calibration.

12. The three-dimensional measurement system based on phase shift according to claim 10, wherein the structural light is periodic structural light, a phase of the structural light increases along an extension direction;

the projector is further configured to emit the structural light to an error calibration surface;

the camera is further configured to photograph the error calibration surface exposed to the structural light to generate an error calibration surface image; and the processor is further configured to perform:

obtaining a plurality pieces of phase data of the error calibration surface image according to the error calibration surface image;

according to an error calibration straight line in the error calibration surface image parallel to the extension direction, obtaining a plurality of pieces of modeling phase data among the pieces of phase data of the error calibration surface image locating at the error calibration straight line;

performing linear fitting on the pieces of modeling phase data to generate a plurality of pieces of ideal phase data;

calculating a plurality of pieces of phase error data according to the pieces of modeling phase data and the pieces of ideal phase data; and building a phase error model according to the pieces of phase error data.

13. The three-dimensional measurement system based on phase shift according to claim 12, wherein the processor is further configured to perform:

generating a plurality of pieces of phase raw data according to the at least one reference object image; and phase compensation on the pieces of phase raw data based on the phase error model to obtain the pieces of phase data of the reference object image.

14. The three-dimensional measurement system based on phase shift according to claim 12, wherein the linear fitting performed by the processor is a least square method.

15. The three-dimensional measurement system based on phase shift according to claim 12, wherein the processor is further configured to perform Fourier analysis and low-pass filtering on the pieces of phase error data to build the phase error model.

16. The three-dimensional measurement system based on phase shift according to claim 10, wherein the reference object comprises a substrate and a step height block disposed on the substrate, the first calibration surface is a top surface of the substrate, and the second calibration surface is a top surface of the step height block.

17. The three-dimensional measurement system based on phase shift according to claim 16, wherein the reference object image has an image region corresponding to the substrate, and a size of the image region is at least ⅔ of the reference object image.

18. The three-dimensional measurement system based on phase shift according to claim 10, wherein the processor is further configured to perform:

computing an average of the pieces of reference phase data of the first calibration surface to obtain the first phase;

computing an average of the pieces of reference phase data of the second calibration surface to obtain the second phase; and computing a quotient of the height of the second calibration surface relative to the first calibration surface divided by the surface phase difference to obtain the phase-height conversion parameter.

* * * * *